Patented Aug. 20, 1946

2,405,965

UNITED STATES PATENT OFFICE 2,405,965

POLYAMIDE EMULSIONS

Robert M. Leekley, Wilmington, Del., assignor to E. I. du Pont de Nemours & Company, Wilmington, Del., a corporation of Delaware No Drawing. Application June 3, 1942, Serial No. 445,652

17 Claims. (Cl. 260—29)

This invention relates to synthetic linear polyamides of the nylon type and more particularly to aqueous emulsions obtained from these polymers.

The polymers used in the practice of this invention are polyamides of the general type described in U. S. Patents 2,071,250, 2,071,253 and 2,130,948. These polyamides, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoamino-monocarboxylic acid, by reacting a diamine with a dibasic carboxylic acid in substantially equimolecular amounts, or by reacting a monoamino-monohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The polyamides are best obtained from these reactants which have a unit length, as defined in the last two patents mentioned above, of at least 7. The average number of carbon atoms separating the amide groups in these polyamides is at least two.

The above described linear polyamides (nylons) include also polymers obtained by admixture of other linear polymer-forming reactants, as for instance, glycol-dibasic acid mixtures or hydroxy acids in the case of polyester-amides, with the mentioned polyamide-forming reactants. Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

As indicated in the above mentioned patents, the polyamides are high molecular weight products which generally can be obtained crystalline in structure as evidenced by X-ray powder diffraction patterns in the massive state. The high molecular weight required for the best fiber- and film-forming properties is obtained by continuing the polymerization reaction until the intrinsic viscosity is at least 0.4. These high molecular weight products in the form of filaments and films can be cold drawn (that is, drawn in the solid state under tension) with high linear extension which results in molecular orientation in the direction of the stress as shown by X-ray examination and which confers improved strength and other physical properties to the product. The preferred polyamides for use in the present invention are those having viscosities in the molten condition (250°–275° C.) between 1000 and 5000 poises.

The usual methods of applying thin coats of the above described polymers use melt or solution casting techniques, or use a dispersion of the polyamide in either a non-solvent or a latent solvent. A number of disadvantages are inherent in these methods. Melt casting requires high temperatures which are difficult to obtain and which frequently adversely affect the material being coated. The use of dispersions likewise necessitates high temperatures if a continuous coating is desired. When solutions are used difficulties arise from their instability which may result in degradation of the polymer or gelation of the solution. Also, great care in coating is necessary to avoid uneven evaporation of the solvent and careful drying is required in order to obtain an attractive film without surface defects. In addition, for many applications the solvent has an undesirable effect on the substrate being coated. For example, in solution coating of leather the solvents may adversely affect the grain of the leather.

Aqueous dispersions of polyamides also have been proposed previously but these compositions, which are obtained by precipitating polyamide particles by mixing a polyamide solution with a miscible liquid non-solvent and re-dispersing the precipitated particles, are not suitable for coating certain substrate because the coating laid down consists of discrete particles which must be fused by heating in order to obtain a continuous film.

An object of this invention is to provide emulsions of synthetic linear polyamides capable of yielding continuous films and particularly adapted for use where a thin nylon film is desired. A further object is an efficient and economical method for preparing these emulsions. Other objects will appear hereinafter.

The above objects are accomplished through procedures more particularly described below whereby a solution of the polyamide in an organic solvent of low water solubility is mixed with water and an emulsion formed by agitation and addition of a surface active agent.

I have discovered that when a solution of the polyamide in a substantially water-insoluble organic solvent at least 50% by volume of which is an alcohol boiling above 100° C., is agitated with water and a surface active agent, an emulsion is obtained which yields continuous films of particular value in the coating art where thin films are desirable. In these emulsions fine droplets of the polyamide in solution are permanently dispersed throughout the water or fine droplets of water are dispersed throughout the polyamide solution, depending in part upon the relative amounts of solution and water used. In forming films, the water evaporates first leaving behind the polyamide solution which deposits a thin film on evaporation of the solvent.

While the polyamide solution and water are preferably mixed in about equal volumes, the proportions may vary from 1 part solution and 4 parts water to 4 parts solution and 1 part water. The substantially water-insoluble organic solvent used in making the polyamide solution is one that is not soluble in water in amount more than about 10 parts of the solvent for 90 parts of water at 20° C. In the preferred embodiment of the invention at least 70% of the organic solvent is alcohol boiling above 100° C., the preferred alcohols being those containing 4–8 carbon atoms.

In the best method of practicing the invention the polyamide solvent contains in addition to 70% by volume of the above defined alcohol an aromatic hydrocarbon or a chlorinated hydrocarbon and can contain also some low boiling alcohol and a small amount of water not substantially greater than about 5%. These solvent mixtures are more desirable than alcohol alone from the standpoint of the viscosity of the solution and the coherence, clearness, brilliance, and drying time of films made therefrom. An example of a preferred solvent system is one consisting on a volume basis of 35% cyclohexanol, 15% benzene, and 45% isobutanol and 5% water.

As surface active agents it is desirable to use a mixture of emulsifying agent and a protective colloid. Some surface active agents, for example, polyvinyl alcohol, can function as both emulsifying agents and as protective colloids.

In preparing the emulsions of this invention a small amount of a surface active agent is incorporated in a solution of the polyamide in the above mentioned solvent. The incorporation of a surface active agent refers either to the addition of both an emulsifying agent and a protective colloid or to the addition only of a material which is listed below as a protective colloid (sodium and ammonium caseinate) or as an anion active emulsifying agent. These surface active agents also include those which are listed as an emulsifying agent (polyvinyl alcohol) but which can function both as an emulsifying agent and as a protective colloid. The polyamide solution containing the surface active agent is then agitated with water and is desirably further emulsified by passing it through a colloid mill or other device which affords a shearing action and will further reduce droplet size. The emulsion also can be prepared easily, but with somewhat less attractive film-forming properties, by the addition of the polyamide solution to the vigorously agitated water solution of the surface active agent. Either "oil-in-water" or "water-in-oil" type emulsions may be readily prepared.

The invention is most advantageously practiced with the interpolyamides, that is, with polyamides obtained by polymerizing a mixture of different polyamide-forming compositions. In addition to the interpolyamides, polyester-amides are readily emulsified by the practice of this invention. The present emulsions can also be made with simple polyamides which are soluble in water-insoluble systems of the kind described herein. Examples of such polyamides are polymerized 12-aminostearic acid, polyhexamethylene β-methyl adipamide, polydiglycol adipamide, and the polymer derived from 3,3'-diaminodipropyl ether and adipic acid. Modified polyamides obtained by reacting a polyamide, dissolved in formic acid, with formaldehyde and an alcohol are also useful in making the emulsions of this invention.

The invention is further illustrated by the following examples in which the parts are by weight unless otherwise indicated.

*Example I*

Three hundred parts of an interpolyamide prepared from 400 parts of hexamethylenediammonium adipate, 300 parts of hexamethylenediammonium sebacate and 300 parts of caprolactam and having a vacuum direct melt viscosity (measured on a sample dried for 3 hours at 100° C. under 20–30 mm. vacuum) of 2000 poises at 250° C. are dissolved with stirring and heating in 2700 parts of a solvent composed of 35 parts by volume of cyclohexanol, 45 parts by volume of isobutanol, 15 parts by volume of benzene and 5 parts by volume of water. To the above described solution cooled to room temperature is then added 15 parts of triethanolammonium oleate and 15 parts of ammonium caseinate. The solution is then vigorously agitated and to it is added dropwise 3000 parts of water. The resulting emulsion is then passed through a disperse mill to still further reduce droplet size. On flowing out some of the emulsion on a glass plate and allowing it to dry, a thin continuous attractive film is obtained.

*Example II*

Three hundred parts of an interpolyamide prepared from 400 parts of hexamethylenediammonium adipate, 300 parts of hexamethylenediammonium sebacate and 300 parts of caprolactam is dissolved in 2700 parts of a mixture consisting, on a volume basis, of 35% cyclohexanol, 45% isobutanol, 15% benzene, and 5% water. This solution is then added to a vigorously stirred equal volume of water containing 15 parts of sodium oleate and 15 parts of ammonium caseinate. The resulting emulsion is stable and when flowed on a level surface and air-dried gives a thin strong continuous film which can be cold drawn or cold rolled.

*Example III*

Three hundred parts of an interpolyamide prepared from 600 parts of hexamethylenediammonium adipate and 400 parts of caprolactam and having a vacuum direct melt viscosity of 1010 poises at 250° C., and 200 parts of amylbenzenesulfonamide are dissolved with stirring and heating in 500 parts of benzyl alcohol. This solution is then added dropwise to a vigorously agitated solution of 200 parts of water containing 10 parts of polyvinyl alcohol. The resulting water-in-oil type emulsion (that is, the polyamide solution constitutes the continuous phase) is further treated by passing it through a colloid mill to further reduce droplet size. The emulsion so obtained is stable and continuous films can be deposited from it on leather, textiles, etc.

*Example IV*

Two hundred fifty parts of an interpolyamide prepared from 400 parts of hexamethylenediammonium adipate and 600 parts of 12 aminostearic acid is dissolved with stirring and heating in 750 parts of benzyl alcohol. This solution is then added dropwise with stirring to 1000 parts of water containing 10 parts of casein and 0.75 part of sodium hydroxide. The resulting emulsion is stable and is suitable for applying thin coats of the interpolyamide to rawhide, leather, fabrics, etc.

*Example V*

Six hundred parts of the reaction product formed by treating 6000 parts of polyhexamethylene adipamide dissolved in 10,000 parts by volume of 90% formic acid with 6000 parts of paraformaldehyde and 4 parts of potassium hydroxide dissolved in 10,000 parts by volume of methyl alcohol, is dissolved in 2400 parts of the solvent mixture given in Example II. This solution of modified polyamide is then added to a vigorously stirred solution of 3000 parts of water containing 15 parts of triethanolammonium oleate and 15 parts of ammonium caseinate. The resulting emulsion is stable and when flowed on a level surface and air-dried gives an elastic, continuous film.

The polyamide solution used in preparing the emulsions generally contains from 5 to 30 per cent by weight of polyamide, the best results in most cases being obtained with solutions containing from 10 to 20 per cent of polymer. The major portion of the solvent consists of alcohol boiling above 100° C. Suitable alcohols in addition to those already mentioned are amyl alcohol, isoamyl alcohol, hexyl alcohol, octyl alcohol, methyl cyclohexanol, crotyl alcohol, and isopropylethynylcarbinol. The preferred diluents or solvents to use in conjunction with the alcohols are aromatic hydrocarbons, for example, benzene, toluene and xylene, and chlorinated hydrocarbons, for example, chloroform, methylene chloride, dichloroethylene, and chlorobenzene. Some low boiling alcohols, for example, methanol, ethanol or isopropyl alcohol, or even water may also be used.

The anion-active class of surface active agents has been found most effective as emulsifying agents in the preparation of these emulsions. Among the best agents found have been sulfonated castor oil, oleyl sodium sulfate, triethanolammonium oleate and sodium oleate. These agents are fairly effective in themselves but their activity is greatly enhanced by the addition of an equal amount of a protective colloid, such as ammonium caseinate or ammonical gelatin. Alkaline emulsifying agents are used with alkaline protective colloids, and acidic emulsifying agents are used with acidic protective colloids. Thus ammonical gelatin is used as protective colloid with an alkaline emulsifying agent, such as sodium oleate, while gum arabic is used as protective colloid with acid emulsifying agent, such as tannic acid.

Although the amount of surface active agent used can be varied considerably, it is desirable to use at least 0.1% based on the weight of polyamide solution and not to exceed 5% on the same basis. The addition of 1% by weight (based on weight of polyamide solution) of a 50:50 mixture of an emulsifying agent and protective colloid is particularly effective in giving a stable emulsion. In the case of a 10% solution of polyamide the final film, then, will be about 91% polyamide and 9% emulsifying agent and colloid. In some cases it may be undesirable to decrease further the polyamide content of the final film and this fact should be considered when determining the amount of emulsifying agent to be added. Smaller amounts of agent are not so effective in giving stable, attractive emulsions.

The present emulsions for some purposes desirably contain other agents such as plasticizers, resins, for example, phenol-formaldehyde resins and sulfonamide-formaldehyde resins, cellulose derivatives, pigments, dyes, antioxidants, and the like.

The emulsions described herein are particularly valuable where a thin polyamide film is desired, for example, a a finishing coat for leather and fabrics, as a textile size, and as a coating for metal, for example, cans. The emulsions are also useful for coating and impregnating paper. The present emulsions when used in coating and impregnating rawhide give results similar to that obtained with water or alcohol solutions of water-soluble polyamides, such as polytriglycol adipamide, in that the rawhide is given the feel and appearance of leather obtained by the usual tanning treatment of rawhide.

The new polyamide emulsions described herein offer valuable advantages in industrial application, as for instance where it is desirable to avoid the high temperatures necessitated in melt casting of polyamide films or in the use of dispersions where fusion is essential to achieve a continuous coating. These emulsions afford further advantages over the use of nylon solutions by reason of their much greater stability and the smaller amount of solvent employed, thereby reducing the cost and danger from toxic effects. Particularly in leather finishing the present emulsion is desirable because it permits the handling of the nylon in an aqueous system, a procedure which is usually employed in the leather industry and which permits increased ease in operation and avoids the adverse effects on the grain of the leather produced by solutions in organic solvents.

As many apparently widely different embodiments of this invention may be made without departing from the spirit and scope thereof, it is to be understood that I do not limit myself to the specific embodiments thereof except as defined in the appended claims.

I claim:

1. A process for making an aqueous emulsion of synthetic linear polycarbonamide which, when applied as a coating and dried, yields thin continuous films, said process comprising dissolving the polycarbonamide in a substantially water-insoluble organic solvent at least 50% by volume of said solvent consisting of an alcohol boiling above 100° C., and mixing with agitation the solution thus obtained with water and a surface active agent, selected from the group consisting of (a) protective colloids consisting of sodium caseinate and ammonium caseinate, (b) anion-active emulsifying agents consisting of triethanolammonium oleate, sodium oleate, sulfonated castor oil and oleyl sodium sulfate, (c) polyvinyl alcohol, and (d) mixtures of a protective colloid defined as an (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

2. A process for making an aqueous emulsion of synthetic linear polycarbonamide which, when applied as a coating and dried, yields thin continuous films, said process comprising dissolving the polycarbonamide in a substantially water-insoluble organic solvent which consists essentially of a mixture of aromatic hydrocarbon with an alcohol boiling above 100° C. and which contains said alcohol in amount of at least 70% by volume of said mixture, and mixing with agitation the solution thus obtained with water and a surface active agent, selected from the group consisting of (a) protective colloids consisting of sodium caseinate and ammonium caseinate, (b) anion-active emulsifying agents consisting of triethanolammonium oleate, sodium oleate, sulfonated castor oil and oleyl sodium sulfate, (c) polyvinyl alcohol, and (d) mixtures of a protective colloid defined as in (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

3. A process for making an aqueous emulsion of synthetic linear polycarbonamide which, when applied as a coating and dried, yields thin continuous films, said process comprising dissolving the polycarbonamide in a substantially water-insoluble organic solvent which consists essentially of a mixture of chlorinated hydrocarbon with an alcohol boiling above 100° C. and which contains said alcohol in amount of at least 70% by volume of said mixture, and mixing with agitation the solution thus obtained with water and a surface active agent, selected from the group consisting of (a) protective colloids consisting of sodium caseinate and ammonium caseinate, (b) anion-active emulsifying agents consisting of triethanolammonium oleate, sodium oleate, sulfonated castor oil and oleyl sodium sulfate, (c) polyvinyl alcohol, and (d) mixtures of a protective colloid defined as in (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

4. A process for making an aqueous emulsion of synthetic linear polycarbonamide which, when applied as a coating and dried, yields thin continuous films, said process comprising dissolving the polycarbonamide in a substantially water-insoluble organic solvent at least 70% by volume of which is an alcohol boiling above 100° C. and mixing with agitation the solution thus obtained with water, an emulsifying agent comprising triethanolammonium oleate, and a protective colloid comprising ammonium caseinate, said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

5. The process set forth in claim 1 in which said organic solvent solution of the polycarbonamide is mixed with water in the proportion of from 1 part solution and 4 parts water to 4 parts solution and 1 part water.

6. The process set forth in claim 1 in which said organic solvent solution of the polycarbonamide is mixed with a substantially equal volume of water.

7. The process set forth in claim 1 in which said polycarbonamide is an interpolyamide.

8. An aqueous emulsion of synthetic linear polycarbonamide which, when applied as a coating and dried yields thin continuous films, said emulsion comprising a surface active agent and in substantial amounts water and a solution of the polycarbonamide in a substantially water-insoluble organic solvent at least 50% by volume of which is an alcohol boiling above 100° C., said surface active agent being selected from the group consisting of (a) protective colloids consisting of sodium caseinate and ammonium caseinate, (b) annion-active emulsifying agents consisting of triethanolammonium oleate, sodium oleate, sulfonated castor oil and oleyl sodium sulfate, (c) polyvinyl alcohol, and (d) mixtures of a protective colloid defined as in (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

9. An aqueous emulsion of synthetic linear polycarbonamide which, when applied as a coating and dried yields thin continuous films, said emulsion comprising a surface active agent and in substantial amounts water and a solution of the polycarbonamide in a substantially water-insoluble organic solvent which consists essentially of a mixture of aromatic hydrocarbon with an alcohol boiling above 100° C. and which contains said alcohol in amount at least 70% by volume of said mixture, said surface active agent being selected from the group consisting of (a) protective colloids consisting of sodium caseinate and ammonium caseinate, (b) anion-active emulsifying agents consisting of triethanolammonium oleate, sodium oleate, sulfonated castor oil and oleyl sodium sulfate, (c) polyvinyl alcohol, and (d) mixtures of a protective colloid defined as in (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

10. An aqueous emulsion of synthetic linear polycarbonamide which, when applied as a coating and dried yields thin continuous films, said emulsion comprising a surface active agent and in substantial amounts water and a solution of the polycarbonamide in a substantially water-insoluble organic solvent which consists essentially of a mixture of chlorinated hydrocarbon with an alcohol boiling above 100° C. and which contains said alcohol in amount at least 70% by volume of said mixture, said surface active agent being selected from the group consisting of (a) protective colloids consisting of sodium caseinate and ammonium caseinate, (b) anion-active emulsifying agents consisting of triethanolammonium oleate, sodium oleate, sufonated castor oil and oleyl sodium sulfate, (c) polyvinyl alcohol, and (d) mixtures of a protective colloid defined as in (a) with anion-active emulsifying agent defined as in (b), said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

11. An aqueous emulsion of synthetic linear polycarbonamide which, when applied as a coating and dried yields thin continuous films, said emulsion comprising an emulsifying agent comprising triethanolammonium oleate, a protective colloid comprising ammonium caseinate and in substantial amounts water and a solution of the polycarbonamide in a substantially water-insoluble organic solvent at least 70% by volume of which is an alcohol boiling above 100° C., said polycarbonamide being the reaction product of a polymer forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

12. The emulsion set forth in claim 8 in which said organic solvent solution of the polycarbonamide is mixed with water in the proportion of from 1 part solution and 4 parts water to 4 parts solution and 1 part water.

13. The emulsion set forth in claim 8 in which said organic solvent solution of the polycarbonamide is mixed with a substantially equal volume of water.

14. The emulsion set forth in claim 8 in which said polycarbonamide is an interpolyamide.

15. A process for making an aqueous emulsion of synthetic linear polycarbonamide which, when applied as a coating and dried, yields thin continuous films, said process comprising dissolving the polycarbonamide in a substantially water-insoluble organic solvent at least 70% by volume of which is an alcohol boiling above 100° C., and mixing with agitation the solution thus obtained with water, and a surface active agent comprising polyvinyl alcohol, said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

16. A process for making an aqueous emulsion of synthetic linear polycarbonamide which, when applied as a coating and dried, yields thin continuous films, said process comprising dissolving the polycarbonamide in a substantially water-insoluble organic solvent at least 70% by volume of which is an alcohol boiling above 100° C. and mixing with agitation the solution thus obtained with water, an emulsifying agent comprising sodium oleate, and a protective colloid comprising ammonium caseinate, said polycarbonamide being the reaction product of a polymer-forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

17. An aqueous emulsion of synthetic linear polycarbonamide which, when applied as a coating and dried yields thin continuous films, said emulsion comprising an emulsifying agent comprising sodium oleate, a protective colloid comprising ammonium caseinate and in substantial amounts water and a solution of the polycarbonamide in a substantially water-insoluble organic solvent at least 70% by volume of which is an alcohol boiling above 100° C., said polycarbonamide being the reaction product of a polymer forming composition comprising reacting material selected from the group consisting of (a) monoaminomonocarboxylic acids, (b) mixtures of diamine with dibasic carboxylic acid, and (c) mixtures of monoaminomonohydric alcohol with dibasic carboxylic acid.

ROBERT M. LEEKLEY.